United States Patent
Andresen (10) Patent No.: US 8,154,141 B2
(45) Date of Patent: Apr. 10, 2012

(54) WIND POWER INSTALLATION AND METHOD OF MODIFYING THE BLADE PITCH IN A WIND POWER INSTALLATION

(75) Inventor: Bjorn Andresen, Oestbirk (DK)

(73) Assignee: Gamesa Innovation & Technology, S.L., Sarriguren (ES)

( * ) Notice: Subject to any disclaimer, the term of this patent is extended or adjusted under 35 U.S.C. 154(b) by 518 days.

(21) Appl. No.: 12/478,233

(22) Filed: Jun. 4, 2009

(65) Prior Publication Data

US 2009/0302608 A1     Dec. 10, 2009

(30) Foreign Application Priority Data

Jun. 9, 2008   (ES) .................................. 200801740

(51) Int. Cl.
*H02K 6/00*      (2006.01)

(52) U.S. Cl. ........................................... 290/44; 290/55
(58) Field of Classification Search .................... 290/44, 290/55; 415/1; 416/147; 700/28
See application file for complete search history.

(56) References Cited

U.S. PATENT DOCUMENTS 7,602,075 B2 * 10/2009 Erdman et al. ................... 290/44
7,719,128 B2 * 5/2010 Kammer et al. ................ 290/44

* cited by examiner

*Primary Examiner* — Tulsidas C Patel
*Assistant Examiner* — Iraj A Mohandesi
(74) *Attorney, Agent, or Firm* — Ladas & Parry LLP (57) ABSTRACT

The wind power installation comprises a rotor with at least one rotor blade, a generator, and a pitch control system for controlling the pitch of the rotor blades, said pitch control system comprising at least one AC motor (100) arranged to be fed by a converter (101). The pitch control system further comprises means (102) for bypassing said converter (101) so as to connect the AC motor (100) to receive power from an emergency AC power supply source.

15 Claims, 7 Drawing Sheets

FIG. 1

Prior Art

WIND POWER INSTALLATION AND METHOD OF MODIFYING THE BLADE PITCH IN A WIND POWER INSTALLATION

FIELD OF THE INVENTION

The present invention relates to the field of wind energy systems and devices, and more specifically to the control of the pitch of the blades of a wind power installation or wind turbine.

STATE OF THE ART

Wind energy systems and installations include one or more wind power generators or turbines arranged to produce electrical energy by rotation induced by the wind. This electrical energy, generated by one or more of these generators (for example, by several generators forming part of or constituting a so-called "wind farm"), is supplied to a grid or network for distribution of the energy. Normally, a large number of electrical power generators are connected to the same grid, and normally several power consumers are also connected to the grid.

Figure 1:
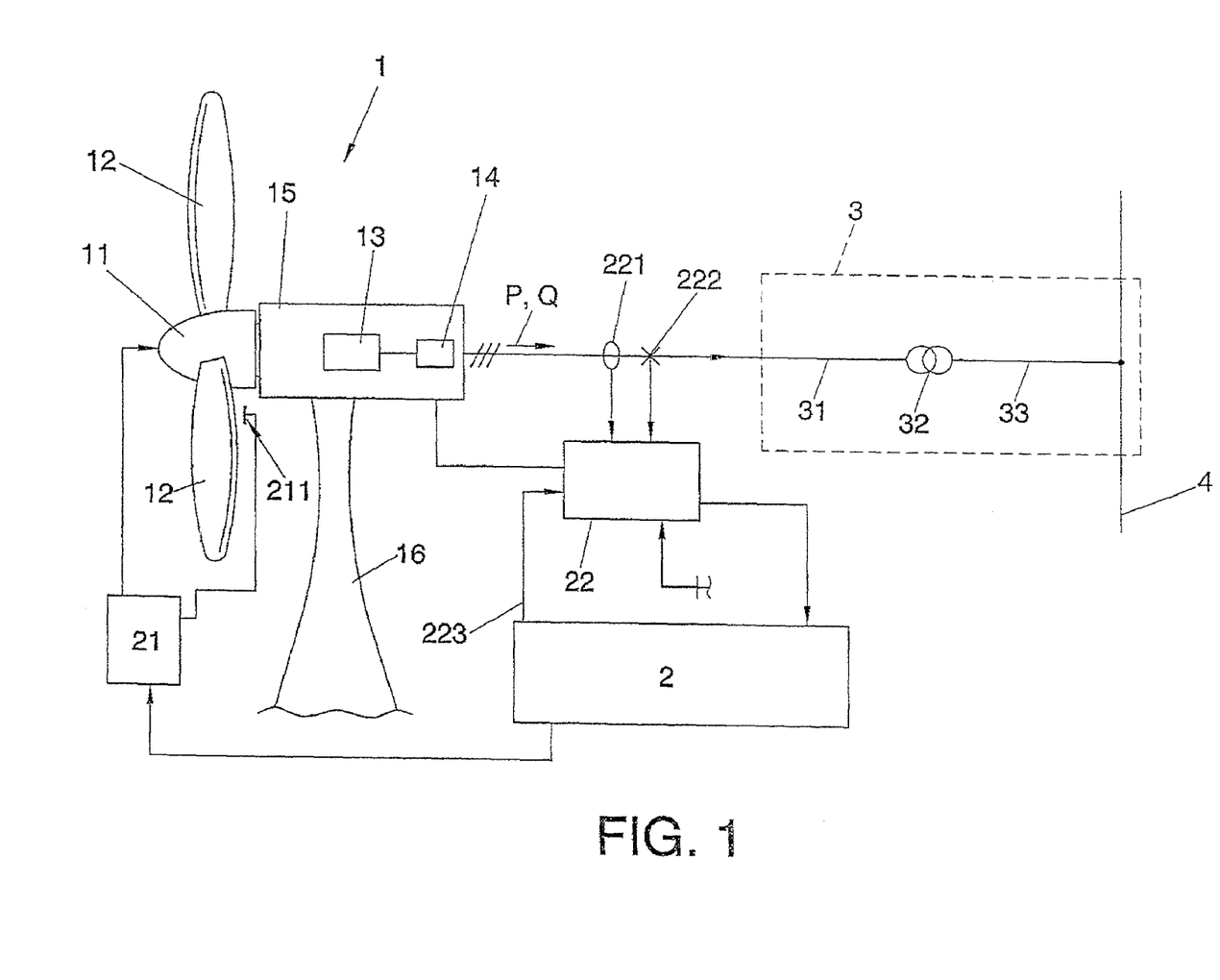
FIGS. 1 and 2: Schematically illustrate some of the main components of a wind power installation, as known in the art but which can also correspond to a wind power installation within the scope of the present invention.
Figure 2:
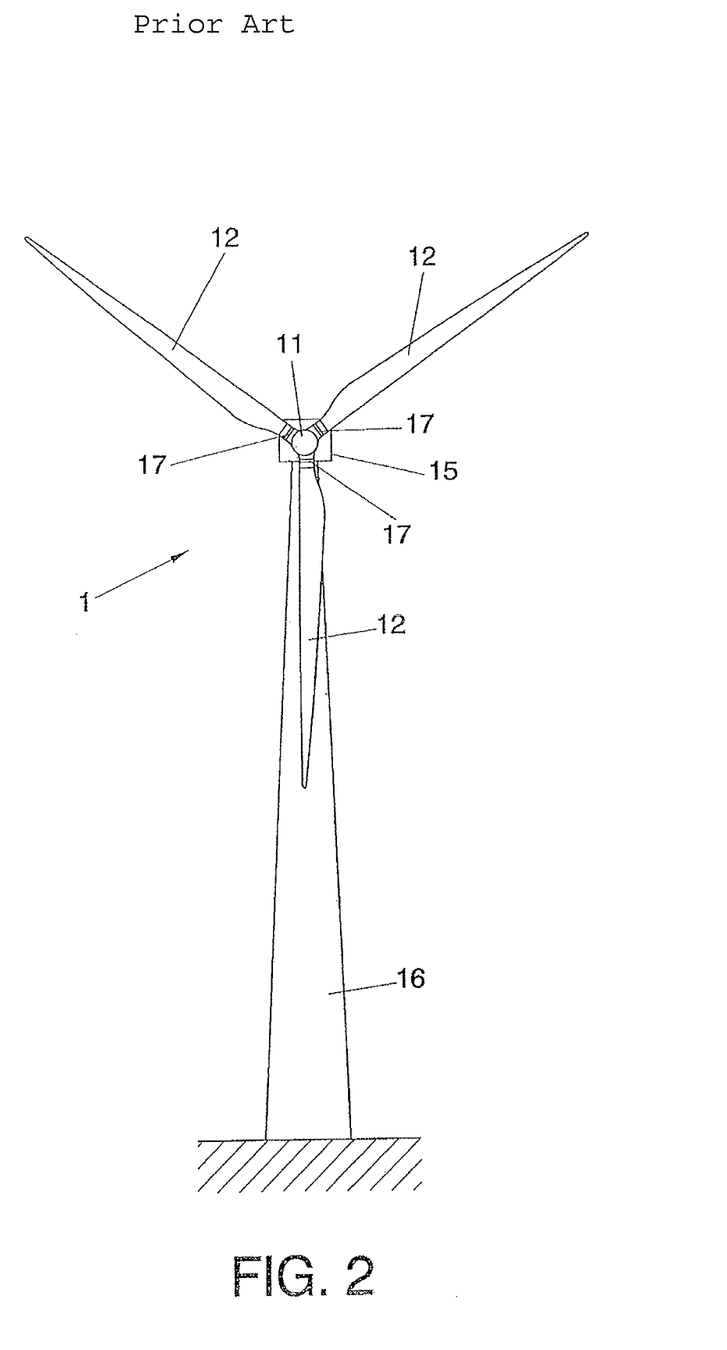

FIGS. 1 and 2 schematically illustrate a wind power installation, including a wind turbine 1 with a rotor having a hub 11 to which blades 12 are attached, the rotor being arranged so that it is made to rotate by the wind, thus producing, sometimes through a gearbox (not illustrated), the corresponding rotation of a generator 13 (namely, of a rotor part of said generator, said generator further comprising a stator part). The generator 13 produces an output AC voltage and can be connected to an electrical converter 14; currently, many different converter designs and arrangements are well known in this field and there is no need to further discuss them here; examples of converter arrangements that can be used within the scope of the present invention include full power converter arrangements (such as the one disclosed in U.S. Pat. No. 5,083,039) and doubly-fed induction generator arrangements such as those using back-to-back power converters (such as the one disclosed in U.S. Pat. No. 6,137,187), as well as systems such as the one disclosed in US-A-2003/0151259; the content of these documents is incorporated herein by reference.

The gearbox, the generator 13 and the electrical converter 14 can all be arranged within a housing or "nacelle" 15, which is normally mounted on a tower 16. However, also other arrangements are possible within the scope of the present invention.

The electrical converter 14 can convert the AC voltage at the output of the generator 13 into a DC voltage, which is subsequently converted into an AC voltage (and current) at a grid side end of the converter 14, which can be connected to the grid or network 4 for distribution of the power generated by the wind turbine to the consumers. This connection can take place through a supply line 3, which can comprise (as illustrated in FIG. 1) components such as a low voltage line 31, a transformer 32 and a high voltage line 33. In a full converter system, the entire power to the grid passes through the converter. In a doubly-fed induction generator system, a part of the power passes through the converter and another part is supplied to the grid without passing through the converter, for example by a direct connection of the stator to the grid, such as illustrated in, for example, FIGS. 1 and 3 of US-A-2003/0151259. All this is conventional and it is not considered necessary to describe it further herein.

Further, the system for wind power generation can comprise a general control system, which can also be fully or partly arranged within the housing or "nacelle" 15, although it can also be external to the housing. As illustrated in FIG. 1, this control system can comprise a main controller 2, provided with the relevant software for the overall control of the system based on pre-stored information and on information provided by different sensors and, for example, on information or instructions from an external operator or operation software. This main controller 2 can control the operation of a pitch regulator 21, which is in charge of setting the pitch of the blades 12 (the "pitch" is also sometimes referred to as the "blade angle") of the rotor on the basis of instructions received from the main controller and, for example, on the basis of information received from sensors 211 at the rotor and/or blades.

Further, there can be a power controller 22 that receives inputs from one or more current sensors 221 and voltage sensors 222.

The power controller 22 can operate the electrical converter 14 so as to provide the correct output power (active power P and reactive power Q) towards the grid, based on the current and voltage information provided by the respective current sensor 221 and voltage sensor 222, and on a power reference signal 223 provided by the main controller 2.

All this is conventional and it is not considered necessary to describe it more in detail. Especially, the way pitch and power regulation should take place in order to provide power to the network in accordance with power demand, network regulations and available wind is well known, and several different practical systems and methods for said control are known from prior art (cf., for example, U.S. Pat. No. 5,083,039, U.S. Pat. No. 6,137,187 and US-A-2003/0151259 referred to above).

The blades 12 of the rotor extend radially from the hub 11. In order to control or regulate, for example, the mechanical wind power uptake by the rotor and/or the angular velocity of the rotor, the so-called "pitch control" referred to above can be used. The pitch control is based on the fact that the "pitch" of the blades can be varied, by turning the blades around their longitudinal axes, for example, in correspondence with a pitch bearing 17 at the hub.

What has been discussed above applies both to many prior art systems and to many systems within the scope of the present invention.

WO-A-2007/098759 discloses one example of how the pitch of a rotor blade can be controlled by means of a pitch bearing.

One important aspect of the pitch control is related to the need to be able to reduce wind power uptake to a minimum by turning the rotor blades away from the wind, so that the effective blade surface on which the wind impacts is minimised. This is also known as rotating the blades into their "feathered pitch" position. This is important as it allows a reduction of the load on the blades and it also helps to brake/stop the wind turbine under all circumstances, for example, in the case of a grid failure. Thus, bringing the blades to the "feathered pitch" position is an effective way of rapidly reducing the rotor speed, and for safety reasons the pitch control system must substantially always be capable of bringing the blades to said "feathered pitch" position. This is also frequently a requirement from the certification bodies, which normally request that a wind power installation include at least two independent systems for stopping the turbine. This implies that a pitch control system must be designed to be able to operate also in situations in which a problem, such as a grid failure, occurs.

Basically, there are two different systems for rotor blade pitch control, namely, hydraulic systems and electric systems (there are also some "hybrid" systems including both hydraulic and electric components).

Whereas in the hydraulic systems the pitch is controlled by pumping a fluid, in an electric system at least one electric so-called pitch motor is provided in correspondence with each blade (for example, often at least one separate or individual pitch motor is provided for each blade, although it could also be possible to use one motor for controlling/modifying the pitch of more than one blade). This motor or motors are normally provided in the hub.

The use of DC motors as well as AC motors is known in the art. For example, WO-A-2007/098759 discloses the use of a DC motor. Originally, in industrial servo applications, DC motors where more frequently used than AC motors, as it was easier to control the torque and speed of them. However, as progress was made in the field of microcontrollers and power semiconductor technology, AC motors became more popular. Thus, there has been a trend towards the use of AC motors. Today, AC motors are often considered to be advantageous in terms of availability as, at present, the number of commercially available and potentially adequate AC motors is larger than that of DC motors. Also, AC motors are advantageous in terms of maintenance (AC motors are simple and basically only the bearings need maintenance, whereas many DC motors require maintenance of the commuter, including change of carbon brushes and removal of carbon dust). Also, AC motors can be more cost-efficient and, at least sometimes, also provide for a simpler circuit design.

Thus, nowadays, for the above reasons, AC motors could often be preferred over DC motors. However, they may imply a certain security problem, as will now be explained, and therefore, in spite of the above-mentioned advantages of AC motors, DC motors are at present still common (maybe even more common than AC motors) as pitch drive motors in wind power installations.

US-A-2006/0163882 discloses a pitch control system based on DC motors normally powered by the grid, but with a "back-up" power supply involving a battery or so-called ULTRACAPS and arranged so that it can be connected to the DC motor either directly or through a converter, so as to guarantee that the pitch motor can be used also in the event of a grid failure. The motor is then powered from the DC back-up battery (or ULTRACAPS), preferably through a converter (which allows the pitch angle to be better regulated) but also, in the event of a converter failure, directly.

US-A-2004/0100229 suggests the use of capacitors instead of batteries for providing energy for rotor blade rotation in an emergency situation.

US-A-2007/0024227 discloses an AC pitch drive with an emergency energy supply device including a plurality of accumulators arranged to support the link voltage of the pitch drive converter during a grid failure. Thus, the DC to AC inverter part of the converter continues to provide power to the AC pitch drive motor also during grid failure.

Also DE-A-10335575 discloses this kind of arrangement.

Whereas the AC pitch drive systems of US-A-2007/0024227 and DE-A-10335575 can be preferred over DC pitch drive systems such as the one disclosed in US-A-2006/0163882 due to the advantages inherent to AC motors (due to, for example, their availability and limited needs for maintenance), it has been found that they may involve a security problem: in the DC pitch drive systems, as taught by US-A-2006/0163882, in the case of a pitch drive converter failure it will still be possible to bring the blades to the feathered pitch position by connecting the DC motors "directly" to the corresponding back-up energy source. However, in AC pitch drive systems such as those of US-A-2007/0024227 and DE-A-10335575, the emergency energy source cannot be directly coupled to the corresponding motor, but needs conversion into AC power, by means of the inverter part of the converter. Thus, in the case of a converter failure, the pitch drive would fail. In the case of a simultaneous converter failure in the pitch drives of more than one blade, such as in two or three of the blades, something that can occur, for example, if the wind turbine is hit by lightening, the consequences could be very serious.

DESCRIPTION OF THE INVENTION

One aspect of the invention relates to a wind power installation comprising:

a rotor comprising at least one rotor blade (for example, two or three rotor blades) connected to a hub;

a generator, said generator being arranged to be driven by the rotor so as to produce electric power, said generator being connected or connectable to a grid (a power transmission/distribution network) for distribution of electric power generated by the generator;

a pitch control system for controlling the pitch (or blade angle) of the rotor blades, said pitch control system comprising, for each rotor blade, a pitch drive comprising at least one AC motor (for example, one or more AC motors for each blade) arranged to interact with the corresponding rotor blade for producing movement of said rotor blade around a longitudinal axis of said rotor blade;

wherein each one of said at least one AC motor is arranged to be fed by a converter (such as an AC/AC converter, which can be arranged in the hub; each AC motor can be provided with an individual converter) of the pitch control system.

In accordance with the invention, the pitch control system further comprises, for each one of said converters, means for bypassing said converter so as to connect the AC motor to receive power from an emergency AC power supply source.

The skilled person will be able to choose the most adequate arrangement for implementing the means for bypassing said converter. For example, a bypass contactor or switch can be used which can be activated (closed) by, for example, one or more of the following means:

a) An appropriate signal from the main controller; if the main controller detects a pitch drive converter failure or that the pitch drive converter is not working correctly, it can activate the bypass switch or other means for bypassing the converter.

b) The means for bypassing the converter (such as a bypass switch) can be activated by a watch-dog function; for example, if there is an error in the communication between, for example, the main controller and the pitch drive, the watch-dog function can, after a certain time, trigger the bypass switch.

c) The means for bypassing the converter (such as a bypass switch) can be activated from the pitch converter system itself in case the controller detects a critical failure such as a HW (HardWare) error in the electronic switches of the pitch drive converter or a critical failure in the DC link of the pitch drive converter.

d) The means for bypassing the converter (such as a bypass switch) could also be activated by a lightning detection system.

Sometimes it can be preferred that it is the pitch drive converter controller itself that activates the bypass switch, directly or indirectly. For example, the pitch drive converter controller can send a signal to the main controller indicating a serious failure in the pitch converter system (an HW error, a DC link error, etc.). Then, the main controller can send a signal to all pitch drives to stop the operation of their converter systems and close the corresponding bypass switches. All the bypass switches can thus be activated and all of the rotor blades will then move towards their feathered pitch position with substantially the same speed as all pitch drive motors will be connected to the same voltage and frequency.

The emergency AC power supply source can be the grid, whereby the AC motor will be fed with current having the grid frequency.

The emergency AC power supply source can be an output end of the generator of the wind power installation, whereby the AC motor will be fed with current having the generator frequency. This option can be especially adequate if a synchronous generator is used, or a generator with high remanence.

Said emergency AC power supply source can be an Uninterrupted Power System, for example, one which is also intended to provide back-up power to other components of the wind power installation or of the wind farm to which the wind power installation belongs.

The means for bypassing the converter can be arranged to connect the AC motor to be substantially directly fed from a nacelle-hub power transfer system (which can comprise, for example, one or more slip-ring units, a rotating transformer, and/or any other device suitable for the transfer of electric power between two devices one of which rotates with regard to the other) arranged to supply power to components inside the hub. In this document, "substantially directly fed" means fed without any intervening semiconductor converter switches. However, it does not exclude the possibility of using a transformer, for example, to lower the level of the input voltage to a level more appropriate for the AC motor of the pitch drive. For example, if the grid voltage is used to feed the AC motor, it can be convenient to reduce the voltage level. Typical grid voltages in the turbine (that is, at the generator side of the transformer 32 in FIG. 2) are in the order of 400V, 690V, 1000V or 3300V, whereas AC motors for this kind of applications are often designed for a nominal voltage of 400V or 690V. As an alternative or complement to a transformer, a motor with a higher voltage class can be used: the isolation in a motor is designed according to the nominal voltage (such as 400V or 690V) but it is possible to obtain motors with a higher isolation level (e.g., a 400V motor having an isolation level of 690 or 1000 V); this is quite common in the case of motors with frequency converters as these produce high peak voltages.

The emergency AC power supply source can also (in addition to the sources mentioned above, or as an alternative to them) comprise an "additional" generator arranged in the hub, for producing AC power inside the hub. This additional generator can be driven by the relative rotating movement between hub and nacelle, and thus represent an "internal" power source in the hub, which does not require electrical power to be supplied from outside the hub. The means for bypassing the converter can thus be arranged to connect the AC motor to be substantially directly fed from said additional generator.

The rotor can comprise a plurality of said rotor blades, and said at least one AC motor can comprise at least one separate AC motor for each one of said rotor blades.

Another aspect of the invention relates to a method of modifying the blade pitch of at least one rotor blade in a wind power installation, said wind power installation comprising:

a rotor comprising at least one rotor blade connected to a hub;

a generator, said generator being arranged to be driven by the rotor so as to produce electric power, said generator being connectable to a grid for distributing electric power generated by the generator;

a pitch control system for controlling the pitch of the rotor blade or blades, said pitch control system comprising, for each rotor blade, a pitch drive comprising at least one AC motor arranged to interact with the corresponding rotor blade for producing movement of said rotor blade around a longitudinal axis of said rotor blade;

wherein each one of said AC motors is arranged to be fed by a converter of the pitch control system (for example, each AC motor by one separate converter).

According to the invention, the method comprises the steps of, in the case of at least one pre-determined condition (such as a failure in one or more of the converters of the pitch control system, an error in the communication between pitch control system and main controller, etc.), bypassing said converter(s) so as to connect the AC motor or motors to receive power from an emergency AC power supply source, and modifying the blade pitch of at least one rotor blade using said at least one AC motor powered from said emergency AC power supply source.

What has been said regarding the wind power installation of the invention also applies to the method, mutatis mutandis.

For example, the emergency AC power supply source can be the grid (whereby the AC motor will be fed with current having the grid frequency), an output end of the generator (whereby the AC motor will be fed with current having the generator frequency) and/or an Uninterrupted Power System.

The step of bypassing the converter can comprise connecting the AC motor to be substantially directly fed from a nacelle-hub power transfer system arranged to supply power to components inside the hub.

As an alternative or as an additional measure, said emergency AC power supply source can comprise an additional generator arranged in the hub for producing AC power inside the hub. If so, said step of bypassing the converter can comprise the step of connecting the AC motor to be substantially directly fed from said additional generator.

BRIEF DESCRIPTION OF THE DRAWINGS

To complete the description and in order to provide for a better understanding of the invention, a set of drawings is provided. Said drawings form an integral part of the description and illustrate some preferred embodiments of the invention, which should not be interpreted as restricting the scope of the invention, but just as an example of how the invention can be embodied. The drawings comprise the following figures.

DESCRIPTION OF A PREFERRED EMBODIMENT OF THE INVENTION

Figure 3:
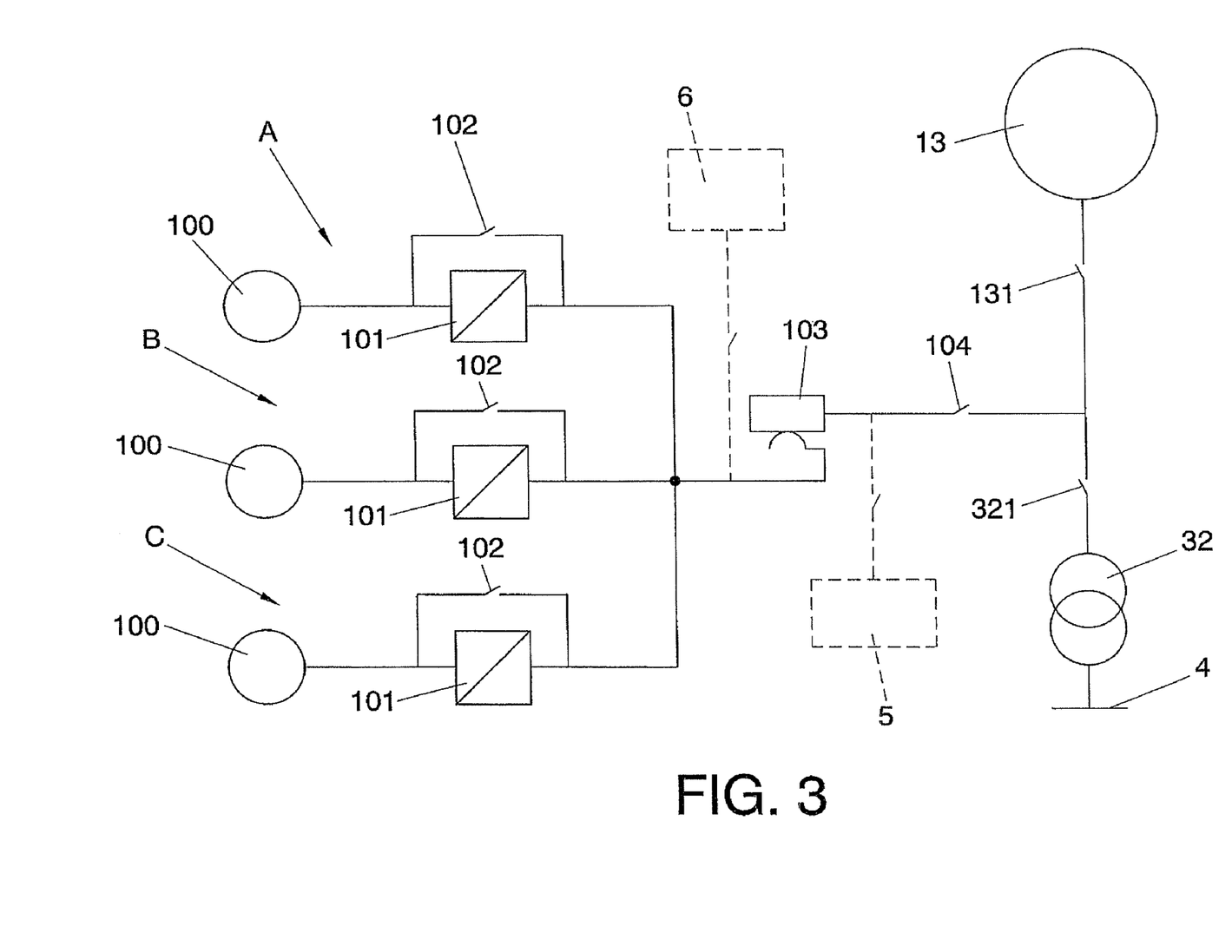
FIGS. 3 and 4: Schematically illustrate a wind power installation with blade pitch drives in accordance with a preferred embodiment of the invention.
Figure 4:
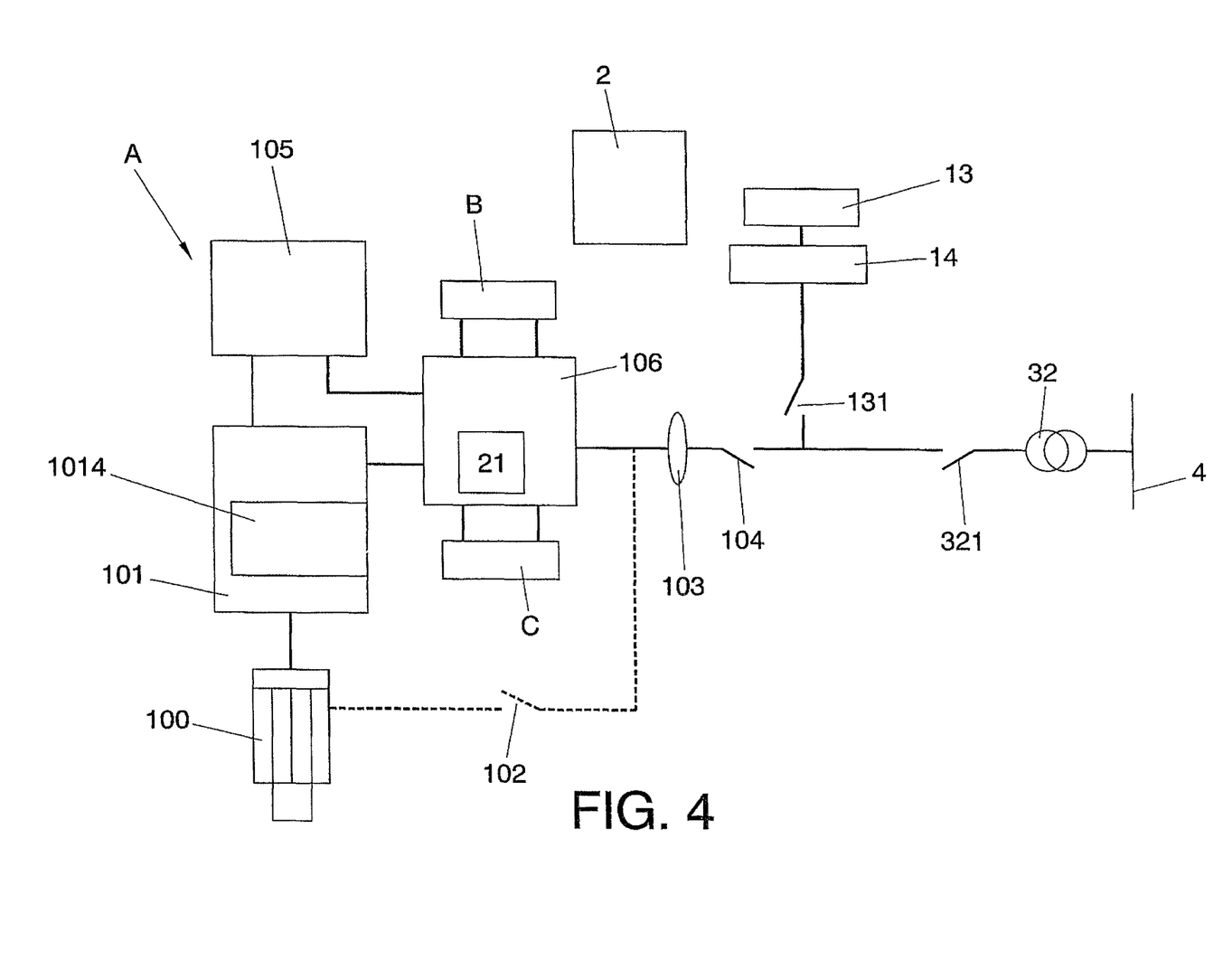
Figure 5:
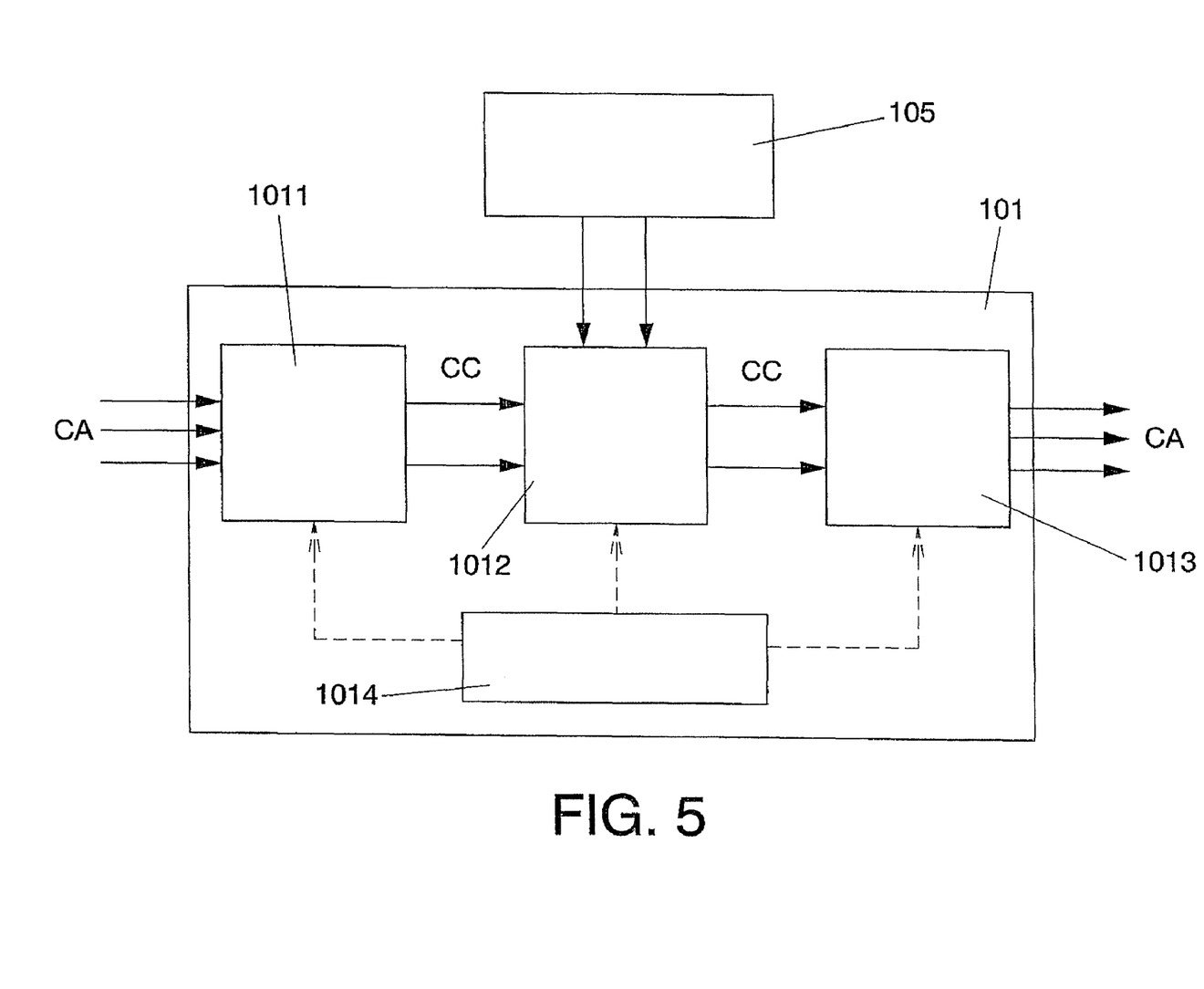
FIG. 5: Schematically illustrates a converter in accordance with a possible embodiment of the invention.

FIGS. 3-5 schematically illustrate some aspects of a wind power installation in accordance with an embodiment of the invention, which can also correspond to what is shown in FIGS. 1 and 2. In FIG. 3, it can be seen how the generator 13 is connected to the grid 4 through a transformer 32 (and, for example, through a converter, not shown), wherein the network between generator 13 and grid 4 further includes a generator contactor 131 and a main contactor 321. There is also a pitch drive supply contactor 104, which when closed allows power to be supplied towards the pitch drive motors from the grid, through a nacelle-hub power transfer system 103 (which can comprise, for example, one or more slip-ring units, a rotating transformer, and/or any other device suitable for the transfer of electric power between two devices one of which rotates with regard to the other), which makes it possible to provide electric power to elements housed in the rotating hub 11 of the wind power installation. During operation, these contactors are normally in the closed position.

Further, three pitch drives A-C are shown, each comprising a converter 101, conventionally fed from the grid 4 side through said nacelle-hub power transfer system 103 (the converters can also be placed in the nacelle, in which case they can feed the AC motors through the nacelle-hub power transfer system, such as a slip-ring unit or rotating transformer). Thus, the converters 101 are supplied by AC power from the grid and convert this AC power into AC power having parameters (such as frequency) controlled by the converter control 1014 (cf. FIGS. 4 and 5), so that this AC power will be suitable for feeding the corresponding AC motors 100 of the pitch drive. Each AC motor 100 is connected to a gear system for driving the corresponding rotor blade 12 around its longitudinal axis. There are many conventional and adequate systems for the connection between AC motor and rotor blade, and there is thus no need to describe them here.

Thus, each AC motor 100 is fed by AC power from the corresponding converter 101. FIG. 5 shows and example of a suitable converter, conventionally comprising a rectifier 1011, a DC link 1012 and a converter or inverter 1013, and governed by a control unit 1014 which can receive its corresponding input signals from the pitch regulator 21 mentioned above.

The DC link can be connected to a back-up battery 105 and/or to another means for energy storage (such as so-called ULTRACAPS), so as to be able to provide back-up power to the motor, should there be a failure on the grid or in the transmission from grid to converter, for example, in the nacelle-hub power transfer system 103. Thus, the converter can, by operation of the inverter part 1013, continue to provide AC power to the motor 100 also in the case of such a failure, at least for a certain period of time, long enough to bring the corresponding blade to its "feathered pitch" position. This arrangement is also illustrated in FIG. 4, in which it can further be observed how the hub houses a central unit 106 including the pitch regulator 21, which supervises each of the pitch drives A-C, wherein the arrangement of the pitch drive A is shown in detail, including the way the converter 101 is arranged to drive the motor 100, under control of the converter control 1014 and with the back-up battery 105 arranged in parallel and charged under the control of the central unit 106.

So far, what has been described could essentially correspond to a prior art system.

However, in order to provide for safety also in the case of damage to the converter 101 (for example, damage affecting the inverter part 1013 of the converter 101), a bypass switch 102 has been provided, which when closed implies a bypass connection that connects the motor 100 substantially directly to the nacelle-hub power transfer system 103, so that the motor can be fed directly from the grid 4 and/or directly from the generator 13 (optionally, through a converter 14 associated with the generator) and/or from an external UPS (Uninterrupted Power Supply) system 5, as schematically illustrated in FIG. 3. This can imply certain disadvantages in that the power applied to the motor may not have the most adequate characteristics, such as an optimised voltage level, frequency, etc., but the power can in any case help to drive the AC motor so as to bring the rotor blades towards their feathered pitch position in an emergency situation, thus contributing to the braking/stopping of the wind turbine.

Figure 7:
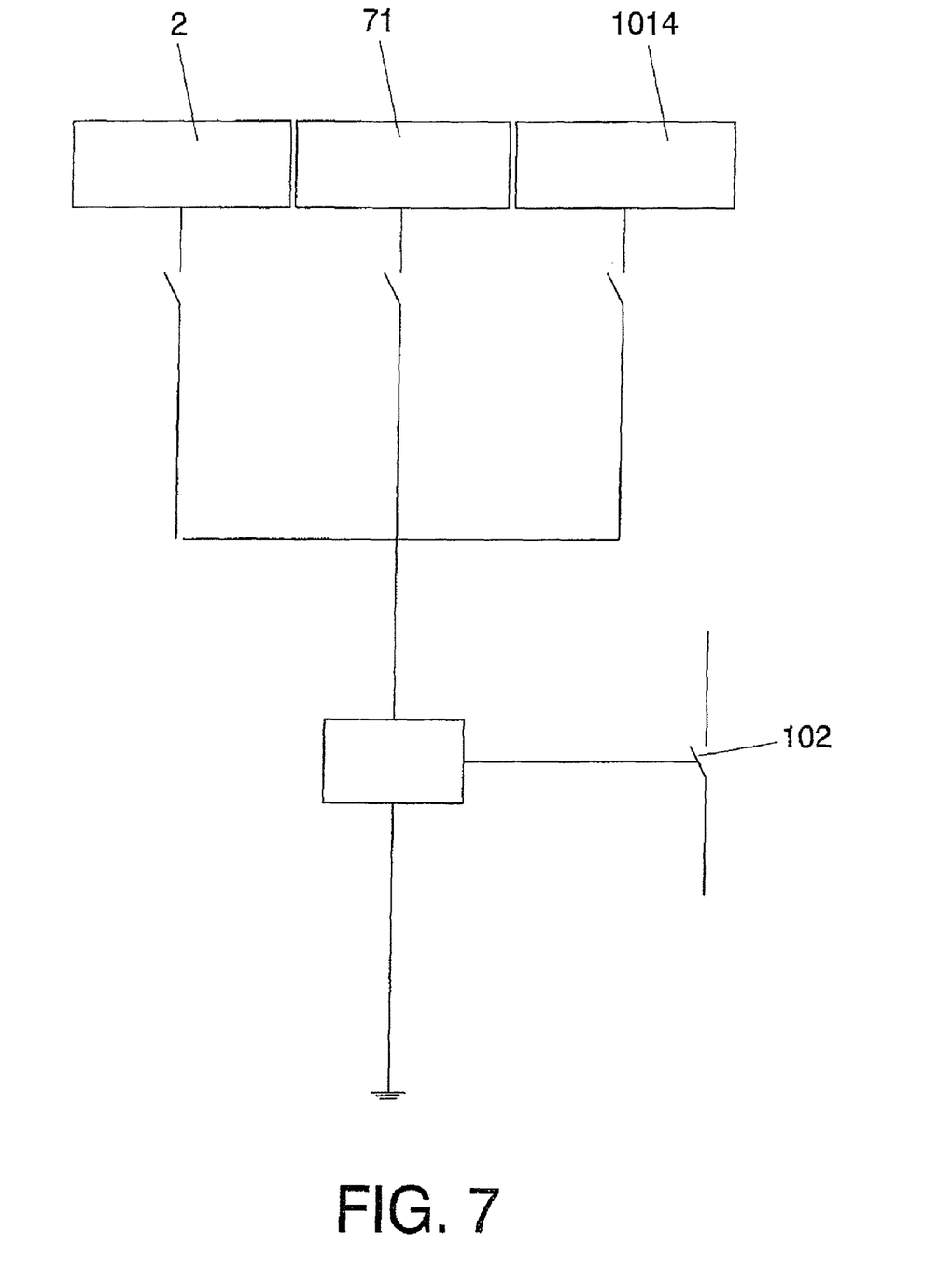
FIG. 7 schematically illustrates some possible ways of controlling the bypassing of the converters of the pitch drives.

As stated above, the bypass switches 102 can be activated in several ways, for example, by any one of the following signals (as schematically illustrated in FIG. 7):

a) The bypass switch 102 can be activated from the main controller 2; for example, if the main controller 2 detects a failure in the converter 101 of one or more of the pitch drives A-C, the main controller can send a signal which triggers the closing of the relevant bypass switch or switches 102.

b) The bypass switch can be activated by a watch-dog function 71; thus, if there is, for example, an error in the communication between the main controller 2 and the pitch drive or the pitch controller 21, the closing of the bypass switches 102 can be triggered.

c) The bypass switch can be activated from the pitch converter system itself, for example, if the converter control unit 1014 detects a critical failure such as an HWerror in the electronic switches of the rectifier 1011 or inverter 1013, or a critical failure in the DC link 1012.

d) The bypass switches 102 could also be activated by a lightning detection system.

For example, the converter controller 1014 can activate the by-pass switch 102 directly or indirectly. The indirect activation can, for example, be based on the converter controller 1014 sending an error signal to the main controller 2, indicating a serious failure in the converter system (HW error, DC link error, etc.). The main controller 2 can then send a signal to all pitch controllers to stop the operation of the pitch drive converters 101 and close the by-pass switches 102. In this case, the by-pass switches 102 of all of the three pitch drives A-C can be activated, and all blades will move towards the feathered pitch position with the same speed, as all pitch drive motors 100 will be connected to the same voltage and frequency.

Figure 6A:
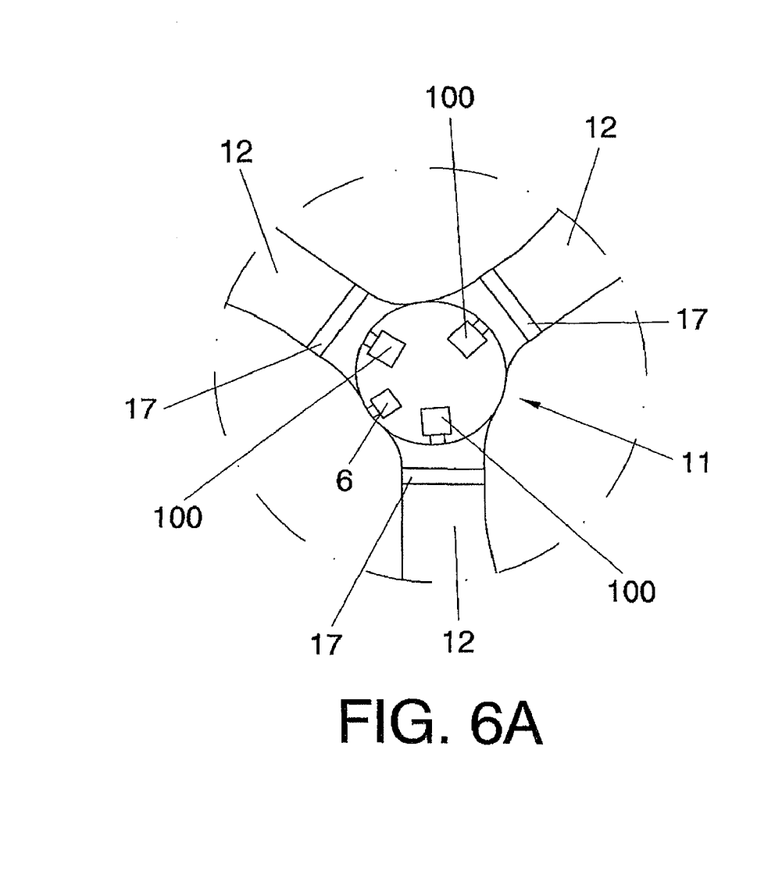
FIGS. 6A and 6B: Schematically illustrate a front and lateral cross sectional view, respectively, of a hub with an additional generator for producing electric power inside the hub.
Figure 6B:
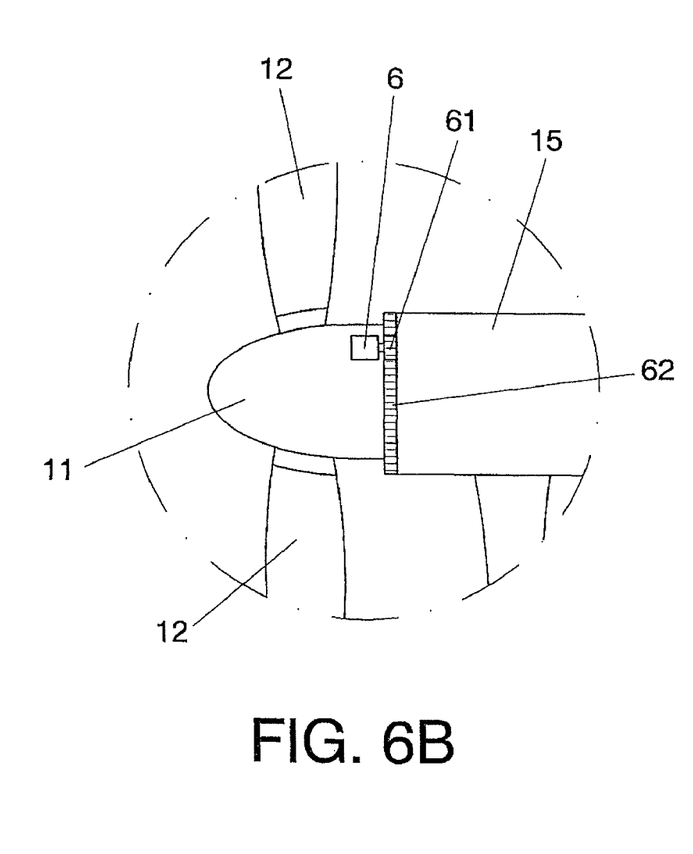

In an alternative embodiment illustrated in FIGS. 6A and 6B, an additional generator 6 (also schematically illustrated in FIG. 3) is arranged within the hub 11, so as to produce electric power within the hub. For example, the generator can comprise a drive wheel or pinion 61 arranged to interact with a drive surface 62 (for example, a surface provided with teeth to interact with the teeth of the pinion 61) arranged inside the nacelle 15, so as to make the pinion 61 rotate around its axis and thus drive the additional generator 6 when the hub 11 rotates around its axis. Thus, electric power is produced inside the hub. In this embodiment, the by-pass switch 102 can be arranged so that, when closed, it provides a by-pass connection that connects the motor 100 substantially directly to the additional generator 6, so that the pitch drive can work also in the case of a failure in the nacelle-hub power transfer system 103.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. Wind power installation comprising:
   a rotor comprising at least one rotor blade (12) connected to a hub (11);
   a generator (13), said generator being arranged to be driven by the rotor so as to produce electric power, said generator being connectable to a grid (4) for distributing electric power generated by the generator;
   a pitch control system for controlling the pitch of the rotor blades, said pitch control system comprising, for each rotor blade (12), a pitch drive (A, B, C) comprising at least one AC motor (100) arranged to interact with the corresponding rotor blade (12) for producing movement of said rotor blade around a longitudinal axis of said rotor blade;
   wherein each one of said at least one AC motor (100) is arranged to be fed by a converter (101) of the pitch control system;
   characterised in that
   the pitch control system further comprises means (102) for bypassing said converter (101) so as to connect the corresponding AC motor (100) to receive power from an emergency AC power supply source.

2. Wind power installation according to claim 1, wherein said emergency AC power supply source is the grid (4), whereby the AC motor will be fed with current having the grid frequency.

3. Wind power installation according to claim 1, wherein said emergency AC power supply source is an output end of the generator (13), whereby the AC motor will be fed with current having the generator frequency.

4. Wind power installation according to claim 1, wherein said emergency AC power supply source is a Uninterrupted Power System (5).

5. Wind power installation according to claim 1, in which said means for bypassing the converter are arranged to connect the AC motor (100) to be substantially directly fed from a nacelle-hub power transfer system (103) arranged to supply power to components inside the hub (11).

6. Wind power installation according to claim 1, wherein said emergency AC power supply source comprises an additional generator (6) arranged in the hub (11) for producing AC power inside the hub.

7. Wind power installation according to claim 6, wherein said means for bypassing the converter are arranged to connect the AC motor (100) to be substantially directly fed from said additional generator (6).

8. Wind power installation according to claim 1, wherein said rotor comprises a plurality of said rotor blades (12), and wherein said at least one AC motor (100) comprises at least one separate AC motor for each one of said rotor blades.

9. Method of modifying the blade pitch of at least one rotor blade in a wind power installation, said wind power installation comprising:
   a rotor comprising at least one rotor blade (12) connected to a hub (11);
   a generator (13), said generator being arranged to be driven by the rotor so as to produce electric power, said generator being connectable to a grid (4) for distributing electric power generated by the generator;
   a pitch control system for controlling the pitch of the rotor blades, said pitch control system comprising, for each rotor blade (12), a pitch drive (A, B, C) comprising at least one AC motor (100) arranged to interact with the corresponding rotor blade (12) for producing movement of said rotor blade around a longitudinal axis of said rotor blade;
   wherein each one of said at least one AC motor (100) is arranged to be fed by a converter (101) of the pitch control system;
   characterised in that
   the method comprises the steps of, in the case of at least one pre-determined condition,
   bypassing at least one converter (101) so as to connect at least one AC motor (100) to receive power from an emergency AC power supply source; and
   modifying the blade pitch of at least one rotor blade (12) using said at least one AC motor (100) powered from said emergency AC power supply source.

10. Method according to claim 9, wherein said emergency AC power supply source is the grid (4), whereby the AC motor will be fed with current having the grid frequency.

11. Method according to claim 9, wherein said emergency AC power supply source is an output end of the generator (13), whereby the AC motor will be fed with current having the generator frequency.

12. Method according to claim 9, wherein said emergency AC power supply source is a Uninterrupted Power System (5).

13. Method according to claim 9, wherein the step of bypassing the converter comprises connecting the AC motor (100) to be substantially directly fed from a nacelle-hub power transfer system (103) arranged to supply power to components inside the hub (11).

14. Method according to claim 9, wherein said emergency AC power supply source comprises an additional generator (6) arranged in the hub (11) for producing AC power inside the hub.

15. Method according to claim 14, wherein said step of bypassing the converter comprises connecting the AC motor (100) to be substantially directly fed from said additional generator (6).

* * * * *